United States Patent Office 3,787,475
Patented Jan. 22, 1974

3,787,475
PROCESS FOR MAKING ARYLOXY DERIVATIVES OF AROMATIC DIESTERS AND DINITRILES
Darrell R. Heath and Joseph G. Wirth, Schenectady, N.Y., assignors to General Electric Company
No Drawing. Filed Jan. 20, 1971, Ser. No. 108,151
Int. Cl. C07c 69/84, 121/74
U.S. Cl. 260—465 F          11 Claims

ABSTRACT OF THE DISCLOSURE

Aryloxy derivatives of aromatic diesters and dinitriles are prepared from reaction of a nitro-substituted phenyl diacid ester or a nitro-substituted phenyl dinitrile with a metal salt of monovalent or divalent aryloxy radicals in the presence of a dipolar aprotic solvent. The invention also includes novel compositions of matter of a difunctional nature prepared in accordance with the above-described process.

---

This invention is concerned with a process for making aryloxy derivatives of aromatic diesters and dinitriles, and products derived therefrom. More particularly, the invention relates to a process which comprises effecting reaction in the presence of a dipolar aprotic solvent of a mixture of ingredients comprising (1) a benzenoid compound selected from the class consisting of (a) compounds of the general formula (I) 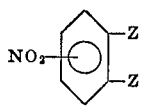

(b) compounds of the general formula (II) 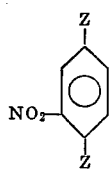

and (c) compounds of the general formula (III) 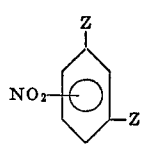

where the NO₂ group in (a) can be positioned anywhere on the benzene ring and in (c) the NO₂ group is adjacent to a Z radical, and (2) an alkali metal salt of an organic compound selected from the class consisting of (a) compounds of the general formula (IV)          R—O—Alk and (b) compounds of the general formula (V)          Alk—O—R'—O—Alk where R is a monovalent aromatic radical, R' is a divalent aromatic radical, Z is either —CN or

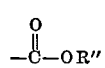

where R" is a monovalent hydrocarbon radical of from 1 to 12 carbon atoms, and Alk is an alkali metal atom.

The invention is also concerned with compositions of matter selected from the class consisting of (a) compounds of the general formula (VI) 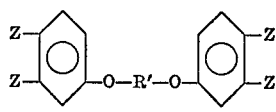

(b) compounds of the general formula (VII) 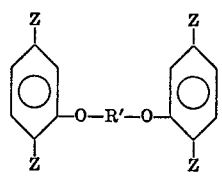

and (c) compounds of the general formula (VIII) 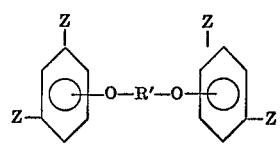

where each oxygen in (c) is adjacent to a Z radical in a commonly shared benzene nucleus and where R' and Z have the meanings above.

Aryloxy derivatives of aromatic diacids have previously been prepared by three different methods. The most common method consists in effecting a copper-catalyzed reaction between an alkali metal phenolate and a halo aromatic compound followed by oxidation of alkyl substituents to carboxylic acid groups. Thus, M. M. Koton and F. S. Florinski in Zh. Org. Khim., 4, 774 (1968), disclose the preparation of 4,4'-dioxyphenylene diphthalic acid by the copper catalyzed reaction of two equivalents of potassium-4,5-dimethylphenolate with 1, 4-dibromobenzene for 4–5 hours at 220–230° followed by potassium permanganate oxidation of the methyl groups to carboxylic acid groups. This method has two major limitations, the first being the known difficulty in reproducing copper-catalyzed reactions of alkali metal phenolates with halo aromatic compounds and the high temperatures required to effect these reactions, and the second being that any group susceptible to oxidation will be oxidized along with the groups which are desired to be oxidized.

A second method for preparation of certain aryloxy phthalate esters has been disclosed in French Pat. 1,573,-736 wherein the sodium salt of dimethyl-4-hydroxyphthalate was caused to react with 4-chloronitrobenzene to give dimethyl-4-(4-nitrophenoxy)phthalate. This method is obviously limited in scope to compounds in which aromatic halogens are highly activated toward nucleophilic displacement. The third method involves reaction between a primary aromatic amine with sodium nitrite to give the diazonium salt followed by reaction of this intermediate with cuprous cyanide to give the aromatic nitrile which may be hydrolyzed to the acid. This reaction seldom proceeds in high yield, requires handling of a highly toxic cyanide and is prohibitively expensive for large scale syntheses.

We have without success attempted to effect direct reaction between a nitrol derivative of an aromatic diacid and an alkali metal phenolate in a dipolar aprotic solvent. For exmple, the reaction of sodium phenoxide and 4-nitrophthalic acid failed to give any product corresponding to the formula

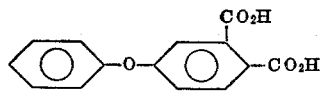

Unexpectedly, we have discovered that although the reaction between sodium phenolate and the nitro acid will not take place with 3-nitrophthalic acid, nitroterephthalic acid or 2- or 4-nitroisophthalic acid, we are able to make aryloxy derivatives of these acids if reaction is effected between a metal phenolate, such as sodium phenolate, with phthalic, isophthalic or terephthalic acid when the acid is in the form of a nitro ester, for instance, diethyl 4-nitrophthalate or in the form of the corresponding nitrophthalonitrile. This reaction between the metal phenolate and the nitro ester or nitrile usually results in high yields of the phenoxy derivative. The phthalic, isophthalic or terephthalic acids or complex derivatives thereof can then be obtained by hydrolysis of either the ester group or of the cyano group. In the case of the aryloxy phthalic acids, various known procedures can be used for conversion to the anhydride form.

By virtue of our invention, we are able to prepare numerous di-, tri- and tetrabasic acids by reaction of a compound of Formulas I, II or III with a metal salt of Formulas IV or V. In effecting the above reactions, it is important that one use a dipolar aprotic solvent in the reaction of either the cyano or ester derivatives of the compounds of Formulas I, II or III. The particular advantages of our invention over the prior art are the mild conditions under which reactions can be carried out, often room temperature is sufficient to effect reaction, generally high yields of products are obtained, the commercially attractive potential of synthesizing aromatic acids containing oxidizable groups (which is impractical to accomplish by presently known prior art methods), and ability to produce diacids and dianhydrides of a broad scope.

Among the monovalent aromatic radicals (this term being intended to include organic radicals containing an aryl radical directly attached to oxygen) which R may represent are, for instance, monovalent aromatic hydrocarbon radicals of from 1 to 10 carbon atoms, for instance, aryl (e.g., phenyl, naphthyl, biphenyl, etc.); alkaryl (e.g., tolyl, xylyl, ethylphenyl, etc.); other organic radicals, e.g., organoxyaryl radicals, for instance, methoxyphenyl, phenoxyphenyl, ethoxyethoxyphenyl, ethoxyphenyl; pyridyl radicals, etc. Typical of the hydroxyaryl compounds from which metal salts of Formula IV may be prepared by reaction with e.g., an alkali metal, an alkali metal hydroxide or carbonate may be mentioned for instance:

> phenol
> 2,6-dimethylphenol
> o,m and p-cresol
> 1- and 2-napthol
> o- and p-phenylphenol
> o-, m-, and p-methoxyphenol
> o-, m-, and p-nitrophenol
> o-, m-, and p-chlorophenol
> m- and p-aminophenol
> m- and p-acetamidophenol
> m- and p-hydroxybenzoic acid
> m- and p-hydroxybenzonitrile
> 3-hydroxypyridine
> 3-hydroxyquinoline
> 5-hydroxypyrimidine Among the divalent aromatic radicals which R' may represent are, for instance, divalent aromatic hydrocarbon radicals of from 1 to 20 carbon atoms, for instance, phenylene, biphenylene, naphthylene, etc. In addition R' may be a residue of a dihydroxy diarylene compound in which the aryl nuclei are joined by either an aliphatic group, a sulfoxide group, sulfonyl group, sulfur, carbonyl group, oxygen, the $-C(CH_3)(CH_2CH_2CO_2H)-$ group, etc. Typical of such diarylene compounds from which the metal salt of Formula V may be prepared by reacting the aforesaid diarylene compound with two mols of an alkali-metal hydroxide may be mentioned:

2,2-bis-(2-hydroxyphenyl)propane;
2,4'-dihydroxydiphenylmethane;
bis-(2-hydroxyphenyl)-methane;
2,2-bis-(4-hydroxyphenyl)-propane hereinafter identified as "bisphenol-A" or "BPA";
bis-(4-hydroxy-5-nitrophenyl)-methane;
bis(4-hydroxy-2,6-dimethyl-3-methoxyphenyl)-methane;
1,1-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone'
4,4'-dihydroxytriphenyl disulfone;
4,4'-dihydroxydiphenyl ether;
4,4'-dihydroxydiphenyl sulfide;
4-hydroxy-o-biphenyl ether;
the 4,3'-, 4,2'-, 4,1'-, 2,2'- 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
2-methyl-2-carboxy-bis-(4-hydroxyphenyl)-propane;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc., dihydric phenols substituted on the aryl nucleus with alkyl, alkenyl, cycloaliphatic, cycloalkenyl, aryl, alkaryl, numerous examples of which have been given above as well as the dihydroxy toluenes, the dihydroxy xylenes, dihydroxy pyridines, dihydroxy anthraquinones, dihydroxy benzoic acid, dihydroxy benzophenones, etc.

The R and R' radicals can also have inert substituents on the aryl nuclei, for instance, monovalent hydrocarbon radicals such as methyl, ethyl, cycloaliphatic radicals (for instance, cyclopentyl, cyclohexyl etc.), etc.; aryl radicals, e.g., phenyl, biphenyl, etc., radicals; alkaryl radicals, e.g., tolyl, ethylphenyl, etc., radicals; aralkyl radicals, e.g., benzyl, phenylethyl, etc., radicals. The substituent on the aryl radical accordingly can be any one which does not constitute or contain an atom or radical reactive with the alkali-metal salt of either Formula IV or Formula V.

Since the radical R" may eventually be removed through hydrolysis techniques in order to obtain a carboxy group, R''' is a monovalent hydrocarbon radical of from 1 to 12 carbon atoms which is not critical in the process herein described. Thus, R" may be an alkyl radical, for instance, methyl, ethyl, propyl, isobutyl, hexyl, 2-ethylhexyl, etc.; an aryl radical, for instance, phenyl, biphenyl, etc.; an aralkyl radical, for instance, benzyl, phenylethyl, etc.; an alkaryl radical, for instance, tolyl, ethylphenyl, etc. Preferably R" is an alkyl radical of from 2 to 4 carbon atoms.

The means whereby the process of the present invention may be practiced and compositions herein defined obtained can be varied widely and to a considerable extent depend on whether a monoalkali metal salt of the General Formula IV or a dialkali metal salt of the General Formula V are employed. When a monoalkali metal salt of Formula IV is used, generally 1 mol of the latter per mol of the compound of Formulas I, II or III is advantageously used. Obviously the molar ratio of these two ingredients may be varied widely and broadly from 1 to up to 3 or more mols of the metal salt of Formula IV per mol of the benzenoid compound of Formula I can be employed. Generally no advantage is obtained in using an excess of the metal salt with the exception that the reaction may be promoted in the direction of higher yields and greater completion.

On the other hand when dialkali metal salts of Formula V are used with the benzenoid compound of Formulas I, II or III, the molar ratio is advantageously at least 2 mols of the compound of General Formula I, II or III per mol of the metal salt of Formula V. Excess molar quantities of the compound of Formulas I, II or III over the molar quantity of the metal salt of Formula V may be employed without departing from the scope of the invention; thus from 2 to 4 or more mols of the compound of Formulas I, II or III may be used per mol of the metal salt of Formula V.

In making the metal salts of Formulas IV and V, it is sometimes advantageous to preform these salts by reacting the corresponding monohydroxy organic compound or dihydroxy organic compound with an alkali-metal hydroxide such as sodium hydroxide, potassium hydroxide, etc. For instance, sodium phenate may be obtained by reacting in a manner well known in the art, 1 mol sodium hydroxide per mol of phenol. By the same token, the dialkali salt of bisphenol-A may be obtained, for instance, by reacting 2 mols of sodium hydroxide per mol of bisphenol-A. Persons skilled in the art will have no difficulty in determining how to make the alkali-metal salts of Formulas IV and V for use with the compounds of Formulas I, II or III.

Alternatively, the phenol or bisphenol may be converted to its alkali metal salt during reaction with compounds of Formulas I, II or III by addition of an alkali metal carbonate in adequate molar concentrations to a reaction mixture composed of the compound of Formula I, II or III and the precursor hydroxy aromatic compound required to form the metal salts of Formulas IV or V.

The conditions of reaction whereby the metal salts of Formulas IV and V are reacted with the compounds of Formulas I, II or III can be varied widely. Generally, temperatures of the order of about 20–150° C. are advantageously employed, although it is possible to employ lower or higher temperature conditions depending on the ingredients used, the reaction product sought, time of reaction, solvent employed, etc. In addition to atmospheric pressure, superpressures and sub-atmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from a few minutes to as much as 30 to 40 hours are advantageously employed to obtain the maximum yield. Thereafter the reaction product can be treated in the manner required to effect precipitation and/or separation of the desired reaction product. Generally, common solvents such as diethyl ether, water, etc., are employed for the purpose. For purification purposes, the final product can be redistilled or recrystallized in manners well known in the art.

It is important that the reaction between the compounds of Formulas I, II or III and the metal salts of Formulas IV or V be carried out in the presence of a dipolar aprotic solvent. The term "dipolar aprotic solvent" is intended to mean any organic solvent which has no active protons which may interfere with the reaction herein described. As will be evident to those skilled in the art, any dipolar aprotic solvent which is capable of dissolving the reactants and causing intimate contact of the reaction ingredients may be used.

Among the preferred aprotic solvents which may be employed in the practice of this invention are non-acid, oxygen-containing, nitrogen-containing organic solvents. These include but are not limited to, for instance, N,N-dimethylacetamide, N-methylpyrrolidone, N,N-dimethylformamide, dimethylsulfoxide, etc.

The amount of solvent used in the reaction mixture may be varied widely. Generally, on a weight basis, one can employ from 0.5 to 50 or more parts of the solvent per part of total weight of the reactants, namely, the compounds of Formulas I, II or III and the metal compounds of Formulas IV or V. The amount of solvent is not critical, but generally we have found that on a weight basis one can employ from 2 to 20 parts of the solvent per part of the total weight of the compounds of Formulas I, II or III and the metal compounds of Formula IV or V.

In order that those skilled in the art may better understand how the present invention may be practiced, the following examples are given by way of illustration and not by way of limitation. Unless otherwise stated, all parts are by weight.

EXAMPLE 1

A mixture of 1.034 grams (0.011 mol) phenol, 0.4 gram (0.01 mol) sodium hydroxide (0.7905 gram of 50.6% aqueous solution), 20 ml. dimethylsulfoxide (DMSO), and 10 ml. toluene was stirred at reflux temperature under nitrogen over a Dean-Stark trap for 4 hours. The reaction mixture was cooled to 100° C., 2.67 grams (0.01 mol) diethyl 4-nitrophthalate was added and the solution was stirred under nitrogen atmosphere at 100–110° C. for 3 hours. The reaction mixture was poured into 300 ml. of water and the product was extracted into ether. The ether extracts were combined, washed with water, 1% sodium hydroxide aqueous solution, dried with sodium sulfate, filtered, and the ether was removed. The product was distilled at 150–160° C. (0.15 mm.) to yield 3.0 grams (95.5% yield) of a liquid which was identified by infra red examination and by elemental analyses as diethyl 4-phenoxyphthalate.

Percent C: Found, 68.2; calculated 68.8. Percent H: Found, 5.86; calculated, 5.74.

EXAMPLE 2

To 10 ml. anhydrous DMSO was added 0.119 gram (0.001 mol) 2-cyanophenol, 0.173 gram (0.001 mol) 4-nitrophthalonitrile and 0.138 gram (0.001 mol) anhydrous potassium carbonate. After stirring for 20 hours at room temperature, the reaction mixture was poured into water. Extraction of the product into ether followed by drying of the extract with sodium sulfate, solvent removal and recrystallization from ethanol-water gave 0.168 gram (69%) 2,3',4'-tricyanodiphenylether, melting point 134–136° C. The product was identified by its spectroscopic properties, infra red, and by mass spectral analysis.

EXAMPLE 3

To 10 ml. anhydrous DMSO were added 0.122 gram (0.001 mol) 4-hydroxybenzaldehyde, 0.173 gram (0.001 mol) 4-nitrophthalonitrile and 0.138 gram (0.001 mol) anhydrous potassium carbonate. After stirring for 20 hours at room temperature, the reaction mixture was poured into water and the product extracted into ether. Drying of the extract with sodium sulfate and solvent removal gave an oily residue which crystallized on standing. Recrystallization from ethanol-water gave 0.149 gram (60% yield) of 4-carboxaldehydro-3′,4′-dicyanodiphenylether, melting point 144–146° C. The product was identified by its spectroscopic properties and by mass spectrum.

EXAMPLE 4

A mixture of 1.09 grams (0.01 mol) 3-aminophenol, 2.67 grams (0.01 mol) diethyl-4-nitrophthalate, 1.38 grams (0.01 mol) potassium carbonate, and 20 ml. DMSO was stirred under a nitrogen atmosphere at 100° C. for 24 hours and was then allowed to cool. The DMSO solution was poured into water and the product was extracted into ether. The ether extract was washed with water, dried with sodium sulfate, filtered, and the ether was removed to leave an oily liquid. Distillation of this liquid at 220° C. (0.15 mm.) gave 2.1 grams (64%) of liquid diethyl - 4 - (3-aminophenoxy)phthalate, whose identity was established by infra red and NMR.

EXAMPLE 5

A mixture of 0.41 gram (0.00375 mol) 4-aminophenol, 1 gram (0.00375 mol) diethyl 4-nitrophthalate, 0.525 gram (0.00375 mol) potassium carbonate, and 10 ml. dry DMSO was stirred under a nitrogen atmosphere at about 110° C. for 48 hours and then allowed to cool. The reaction mixture was poured into water and the product was extracted into ethyl ether. The ether extract was washed with water, dried with sodium sulfate, filtered, and the ether was removed to leave an oily liquid which was distilled at 200–210° C. (0.1 mm.) to give 1.18 grams (96%) of a liquid which crystallized slowly on standing at room temperature. The distilled product was recrystallized from ethanol-water to give long white needles which had a melting point of 74–76° C. This material was identified by infra red, NMR and by elemental analyses as diethyl-4-(4-aminophenoxy)phthalate.

Percent C: Found, 66.3; calculated, 65.6. Percent H: Found, 5.93; calculated, 5.78. Percent N: Found, 4.60; calculated, 4.26.

EXAMPLE 6

A mixture of 0.94 gram (0.01 mol) phenol, 0.40 gram (0.792 gram) 50.5% aqueous solution, 0.01 mol) sodium hydroxide, 20 ml. of anhydrous DMSO which had been sparged wtih nitrogen, and 10 ml. of benzene was stirred at reflux under nitrogen over a Dean-Stark trap for four hours and the benzene was removed by distillation. The DMSO solution was cooled to 50° C. and 1.73 grams (0.01 mol) of 4-nitrophthalonitrile was added. The mixture was stirred under nitrogen at room temperature for 15 minutes and was then poured into 100 ml. of water. The product was extracted from the aqueous solution into ether and the ether extract was washed with water, dried with sodium sulfate and filtered. The ether was removed to leave a white solid which was distilled at 155–165° C. (0.15 mm.) to give 2.10 grams (95.5%) of pale green solid. Recrystallization from absolute ethanol gave white needles which were filtered and dried "in vacuo"; melting point 100–101° C. This product was identified as 4-phenoxyphthalonitrile by infra red and by elemental analyses.

Percent C: Found, 76.3; calculated, 76.4. Percent H: Found, 3.60; calculated, 3.64. Percent N: Found, 12.7; calculated, 12.72.

EXAMPLE 7

A mixture of 2.78 grams (0.02 mol) 3-nitrophenol, 3.46 grams (0.02 mol) 4-nitrophthalonitrile, 2.76 grams (0.02 mol) anhydrous potassium carbonate, and 20 ml. dry nitrogen-sparged DMSO was stirred under nitrogen at room temperature for 4 hours and the reaction mixture was then poured into 100 ml. of water. The product was extracted into methylene chloride which was washed with water, dried with sodium sulfate and filtered. The solvent was distilled to leave a white solid which upon distillation at 180–230° C. (0.1–0.05 mm.) gave 5.23 grams of a solid which was recrystallized from acetonitrile to give 3.65 grams (69%) of fine pale blue-green needles, melting point 167–168° C. This product was identified as 4-(3-nitrophenoxy)phthalonitrile by infra red and by elemental analyses.

Percent C. Found, 63.4; calculated, 63.4. Percent H: Found, 2.60; calculated, 2.64. Percent N: Found, 16.0; calculated, 15.85.

EXAMPLE 8

A sodium phenoxide solution in dimethyl sulfoxide (DMSO) was prepared by addition of 0.94 gram (0.01 mol) phenol to 0.8 gram (0.01 mol) 50% aqueous sodium hydroxide in 20 ml. DMSO and warming to 70° C. Toluene, 20 ml. was added and water was removed by azeotropic distillation. The system was maintained in a nitrogen atmosphere. When the solution was anhydrous, toluene was distilled out and 2.67 grams (0.01 mol) diethyl nitroterephthalate was added. After heating for 6 hours at 100° C., the solution was poured into water and the product extracted into ether. The extract was dried with sodium sulfate, concentrated to small volume and distilled in a kugelrohr. The fraction which distilled at 150–160° C./0.1 mm. weighing 2.6 grams (86%) was collected. This product was identified as diethylphenoxyterephthalate by NMR and by mass spectrum.

EXAMPLE 9

A sodium phenoxide solution in dimethylsulfoxide prepared similarly as in Example 8 was mixed with 20 ml. toluene and water was removed by azeotropic distillation while the system was maintained in a nitrogen atmosphere. When the solution was anhydrous, toluene was distilled out and 2.67 grams (0.01 mol) diethyl-2-nitroisophthalate was added. After heating for 3 hours at 100° C., the solution was poured into water and the product extracted into ether. The extract was dried with sodium sulfate, concentrated to small volume and distilled in a kugelrohr. The fraction which distilled at 150–160° C. weighing 2.75 grams (91%) was identified as diethyl-2-phenoxyisophthalate by NMR and mass spectrum.

EXAMPLE 10

To 10 ml. DMSO were added 1.34 grams (0.005 mol) diethyl 4-nitrophthalate and 0.68 gram (0.01 mol) sodium ethoxide. The resulting solution was stirred for about 18 hours and then poured into water. The product was extracted into ether and the extract was dried with sodium sulfate. Solvent removal left an oil which was distilled at 170° C./0.1 mm. to give 0.60 gram (45%) diethyl-4-ethoxyphthalate whose identity was established by NMR.

EXAMPLE 11

1,4-bis(3,-dicarboethoxyphenoxy)benzene was prepared as follows. A mixture of 2.67 grams (0.01 mol) diethyl-4-nitrophthalate, 0.55 gram (0.005 mol) hydroquinone, 1.38 grams (0.01 mol) potassium carbonate, and 20 ml.

dry DMSO was stirred under nitrogen at 100° C. for 48 hours. The reaction mixture was poured into water and the product was extracted from the aqueous solution into diethyl ether. The ether extract was washed with water, 1% hydrochloric acid solution, 1% sodium hydroxide solution, treated with decolorizing carbon, dried with sodium sulfate, filtered, and the ether removed. The product was distilled at 220–250° C. (0.1 mm.) to give 1.45 grams (53%) of oil which was dissolved in 30 ml. of warm absolute ethanol and the product separated from solution at 0° C. as fine white needles which were filtered cold and dried "in vacuo," melting point 48–50° C. Identity of the product was established by infra red and by elemental analyses.

Percent C: Found 65.4; calculated 65.5. Percent H: Found, 5.58; calculated 5.46.

EXAMPLE 12

Bis(3,4-dicyanophenyl)ether of bisphenol-A was prepared as follows. A mixture of 1.71 grams (0.0075 mol) bisphenol-A, 0.6 gram (1.1881 grams 50.5% aqueous solution, 0.015 mol) sodium hydroxide, 20 ml. nitrogen-sparged DMSO, and 15 ml. benzene was stirred at reflux under nitrogen over a Dean-Stark trap for 4 hours and the benzene was then removed by distillation. The reaction mixture was cooled to room temperature and 2.595 grams (0.015 mol) 4-nitrophthalonitrile was added. The mixture was stirred under nitrogen at room temperature for 1.5 hours and was then poured into 100 ml. of water. The product which separated from the aqueous solution as a white powder was extracted into methylene chloride and the extract was washed with water, dried with sodium sulfate, and filtered. The solvent was removed and the residue was recrystallized from toluene/hexane solution to give 3.1 grams (86% yield) of a white grannular solid, melting point 195–196° C. This product was identified as the above compound by infrared and by elemental analyses.

Percent C: Found, 77.6; calculated, 77.5. Percent H: Found, 4.24; calculated, 4.17. Percent N: Found, 11.8; calculated 11.66.

This compound had the formula

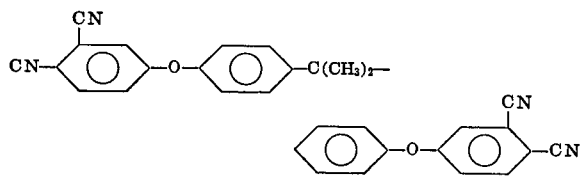

The four cyano groups can be hydrolyzed in a manner well-known in the art to give the corresponding tetracarboxy derivative. Dehydration of the tetracarboxy derivative yields the corresponding dianhydride having the formula

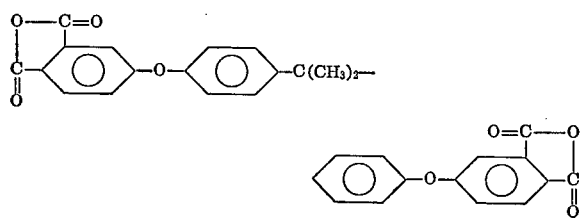

EXAMPLE 13

1,4-bis(3,4-dicyanophenoxy)benzene was prepared by first forming a mixture of 1.10 grams (0.01 mol) hydroquinone, 3.56 grams (0.02 mol) 4-nitrophthalonitrile, 2.76 grams (0.02 mol) anhydrous potassium carbonate, and 15 ml. of dry, nitrogen-sparged DMSO. This was stirred under nitrogen at room temperature for 24 hours and the mixture was poured into 200 ml. of water. The precipitate was filtered, washed with water, dried "in vacuo" and dissolved in 250 ml. boiling acetonitrile. The product crystallized from the acetonitrile as fine pale blue needles amounting to 2.2 grams (61% yield). The crystallized product was distilled at 300–310° C. (0.05 mm.) to yield an oil which solidified on cooling. This solid material was recrystallized from acetonitrile to give 2.1 grams of the desired compound, melting point 255–257° C. whose identity was established by infrared and by elemental analyses.

Percent C: Found, 72.7; calculated, 72.9. Percent H: Found, 2.70; calculated 2.75. Percent N: Found, 15.6; calculated 15.45.

When the tetracyano compound is hydrolyzed to yield the corresponding tetracarboxy derivative, and the latter dehydrated, one obtains a compound having the formula

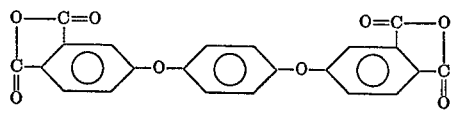

EXAMPLE 14

A mixture of 0.93 gram (0.005 mol) 4,4'-dihydroxybiphenyl, 0.4 gram (0.792 gram of 50.5% aqueous solution, 0.01 mol) sodium hydroxide, 20 ml. nitrogen-sparged DMSO, and 20 ml. benzene was stirred under a nitrogen atmosphere at reflux temperature over a Dean-Stark trap for 18 hours and the benzene was then removed by distillation. The mixture was cooled to room temperature, 1.73 grams (0.01 mol) 4-nitrophthalonitrile was added, and stirring under nitrogen at 25° C. was continued for 40 hours. The mixture was poured into 200 ml. of water and the product, a white granular solid, was filtered and washed with water. Recrystallization from acetonitrile gave 2.10 grams of product (96.0% yield), melting point 233–233.5° C. The identity of the product as 4,4'-bis(3,4-dicyanophenoxy)biphenyl was established by infrared and by elemental analyses.

Percent C: Found, 76.4; calculated, 76.74. Percent H: Found, 3.1; calculated 3.20. Percent N: Found, 12.7; calculated, 12.38.

EXAMPLE 15

A mixture of 0.723 gram (0.005 mol) 2-chlorohydroquinone, 1.73 grams (0.01 mol) 4-nitrophthalonitrile, 1.38 grams (0.01 mol) potassium carbonate, and 15 ml. dry nitrogen-sparged DMSO was stirred under a nitrogen atmosphere at room temperature for 40 hours. The solution was poured into water and the precipitate which separated was isolated by filtration, washed with water, dried "in vacuo," and distilled at 230° C. (0.05 mm.) to give 1.8 grams (91% yield) of an oily liquid which solidified on cooling to form a white solid. The distilled product was recrystallized from acetonitrile to give fine white needles, melting point 204–205.5° C. The product was identified as 2-chloro-1,4-bis-(3,4-dicyanophenoxy) benzene by infrared and by elemental analyses.

Percent C: Found, 66.3; calculated, 66.6. Percent H: Found, 2.2; calculated, 2.27. Percent N: Found, 14.1; calculated, 14.11. Percent Cl: Found, 8.7; calculated 8.95.

EXAMPLE 16

A mixture of 1.25 grams (0.005 mol) 4,4'-dihydroxydiphenyl sulfone, 0.4 gram (0.791 gram 50.5% aqueous solution, 0.01 mol) sodium hydroxide, 20 ml. nitrogen-sparged DMSO, and 20 ml. of benzene was stirred under nitrogen atmosphere at reflux over a Dean-Stark trap for 18 hours and the benzene was removed by distillation. The mixture was cooled to room temperature and 1.73 grams (0.01 mol) of 4-nitrophthalonitrile was added and stirring was continued at room temperature (about 26–28° C.) in air for 40 hours. The homogeneous solution thus obtained was poured into 200 ml. of water and the precipitate which separated was isolated by filtration, washed with water, dried "in vacuo" and recrystallized from acetonitrile. The product separated from the cooled solution as golden needles and was filtered and dried "in vacuo" to give 1.5 grams (60%) yield, melting point 229–230° C. of 4,4'-bis-(3,4-dicyanophenoxy)diphenylsulfone. The product was identified as such by infrared and by elemental analyses.

Percent C: Found, 66.6; calculated, 66.93. Percent H: Found, 2.8; calculated, 2.79. Percent N: Found, 11.3; calculated, 11.14. Percent S: Found, 6.3; calculated, 6.38.

EXAMPLE 17

A mixture of 1.01 grams (0.005 mol) 4,4'-dihydroxydiphenyloxide, 0.4 gram (0.792 gram 50% aqueous solution, 0.01 mol) sodium hydroxide, 20 ml. nitrogen-sparged DMSO, and 20 ml. benzene was stirred under nitrogen at reflux over a Dean-Stark trap for 18 hours and the benzene was removed by distillation. After cooling to room temperature, 1.73 grams (0.01 mol) of 4-nitrophthalonitrile was added and the mixture was stirred under nitrogen at room temperature for 15 hours and then poured into 200 ml. of water. The product was extracted from the aqueous solution into methylene chloride. The extract was washed with water, dried with sodium sulfate, filtered, and the solvent was removed to leave a white solid which was recrystallized from aqueous acetonitrile to give 1.6 grams (58% yield) of white needles. This product was identified as 4,4'-bis-(3,4-dicyanophenoxy)diphenyloxide by infrared and by elemental analyses.

Percent C: Found, 74.4; calculated, 74.1. Percent H: Found, 3.1; calculated, 3.09. Percent N: Found, 12.4; calculated, 12.3.

EXAMPLE 18

A mixture of 1.22 grams (0.01 mol) 3,4-dimethyl phenol, 0.4 gram (0.792 gram 50.5% aqueous solution, 0.01 mol) sodium hydroxide, 15 ml. nitrogen-sparged DMSO, and 15 ml. benzene was stirred at reflux under nitrogen over a Dean-Stark trap for 4 hours and the benzene was removed by distillation. The reaction mixture was cooled to 40° C. and 2.67 grams (0.01 mol) diethyl 4-nitrophthalate in 5 ml. dry, nitrogen-sparged DMSO was added and the mixture was stirred under a nitrogen atmosphere at room temperature for 64 hours. The reaction was quenched by pouring into water and the product, which separated as an oil, was extracted into diethyl ether. The ether extract was washed with water, aqueous sodium bicarbonate solution, dried with sodium sulfate, filtered, and the ether was removed to leave a yellow oil. Distillation of this oil at 165–175° C. (0.025 mm.) gave 3.0 grams (88%) of a liquid identified by infrared and by NMR as 4-(3,4-dimethylphenoxy)diethylphthalate.

EXAMPLE 19

To a mixture of 1.73 grams (0.010 mol) 4-nitrophthalonitrile, 1.00 gram (0.005 mol) 4,4'-methylenediphenol and 1.38 grams anhydrous potassium carbonate was added 10 ml. nitrogen-spared DMSO. The resulting mixture was stirred for about 18 hours at room temperature and then poured into water. The white precipitate which formed was collected and recrystallized from ethanol-water to give 2.0 grams (80% yield) 4,4'-bis(3,4-dicyanophenoxy)-diphenylmethane. The identity of this compound was identified by infrared and by elemental analyses.

Percent C: Found, 77.1; calculated, 77.4. Percent H: Found, 3.5; calculated, 3.13. Percent N: Found, 12.3; calculated, 12.4.

EXAMPLE 20

To a mixture of 1.07 grams (0.004 mol) diethyl-2-nitroisophthalate, 0.22 gram (0.002 mol) hydroquinone and 0.55 gram (0.004 mol) potassium carbonate was added 10 ml. nitrogen-sparged DMSO. The resulting mixture was heated at 100° C. for 48 hours and then poured into water. The product separated as an oil and was extracted into ether. The extract was washed with water, dried over sodium sulfate and concentrated. Distillation of the residue at 250° C./0.1 mm. gave 0.60 gram (55%) of 1,4-bis(2,6-dicarboethoxyphenoxy)benzene which crystallized on cooling, melting point 102–103° C., and was identified by infrared, NMR spectra and by elemental analyses.

Percent C: Found, 65.3; calculated, 65.4. Percent H: Found, 5.42; calculated, 5.45.

This compound had the formula

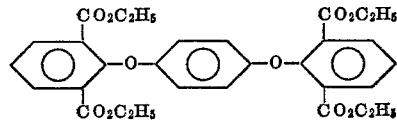

EXAMPLE 21

To a mixture of 2.67 grams (0.010 mol) diethyl nitroterephthalate, 0.55 gram (0.005 mol) of hydroquinone and 1.38 grams (0.010 mol) potassium carbonate was added 20 ml. of nitrogen-sparged DMSO. The resulting mixture was heated for 48 hours at 100° C. and then poured into water. The product separated as an oil and was extracted into ether. The extract was washed with water, dried over sodium sulfate and concentrated to small volume. Distillation of the residue at 250° C./0.1 mm. gave 0.75 gram (27%) of 1,4-bis(2,5-dicarboethoxyphenoxy)benzene which crystallized on cooling, melting point 124–125° C., and was identified by infrared, nmr spectra and by elemental analyses.

Percent C: Found, 65.3; calculated, 65.4. Percent H: Found, 5.44; calculated, 5.45.

The compound had the formula

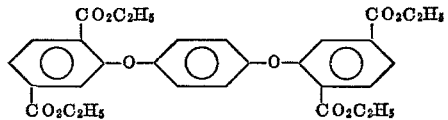

EXAMPLE 22

Employing the same conditions as are recited in Examples 1 and 6, other compositions can be prepared by substituting other reactants of Formulas I, II or III in place of the corresponding reactants in these examples, and other reactants of Formula IV in place of the corresponding metal salts used in these earlier examples. The following Table I recites some of the reactants which can be employed to form these compositions. The heading "Reactant A" corresponds to the compound of Formula I, II or III which can be used and the heading "Reactant B" corresponds to the precursor hydroxy compound of Formula IV. The products derived from the reaction of Reactants A and Reactants B are found under the heading "Product" in said Table I. In all tables, the designation "Et" is intended to mean the $-C_2H_5$ radical.

EXAMPLE 23

Employing the same conditions as recited in Examples 11 and 12, other compositions can be prepared coming within the scope of Formula VI, substituting other reactants of Formula I in place of the corresponding reactant in Examples 11 and 12, and other reactants of Formula V in place of the metal salts used in the latter two examples. The following Table II recites some of the reactants which can be employed to form products coming within the scope of Formula VI. The definitions of "Reactant A," "Reactant B," "Product" and the designation "Et" are the same as those recited for the equivalent terms in Example 22.

TABLE I

| Sample No. | Reactant A | Reactant B | Product |
|---|---|---|---|
| 1 | Diethyl-4-nitrophthalate | p-Phenylphenol | Diethyl-4-(4-phenylphenoxy)phthalate. |
| 2 | Diethyl-3-nitrophthalate | p-Chlorophenol | Diethyl-3-(4-chlorophenoxy)phthalate. |
| 3 | 4-nitrophthalonitrile | p-Cresol | 4-(4-methylphenoxy)phthalonitrile. |
| 4 | 3-nitrophthalonitrile | p-Aminophenol | 3-(4-Aminophenoxy)phthalonitrile. |
| 5 | Diethyl-nitroterephthalate | m-Hydroxybenzoic acid | Diethyl-4-carboxyphenoxyterephthalate. |
| 6 | Nitroterephthalonitrile | 3-nitrophenol | 4-nitrophenoxyterephthalonitrile. |
| 7 | Diethyl-2-nitroisophthalate | p-Hydroxybenzoic acid | Diethyl-2-(4-carboxyphenoxy)isophthalate. |
| 8 | Diethyl-4-nitroisophthalate | m-Hydroxybenzoic acid | Diethyl-4-(3-carboxyphenoxy)isophthalate. |
| 9 | 2-nitroisophthalonitrile | p-Hydroxybenzaldehyde | 2-(4-carboxaldehydrophenoxy)isophthalonitrile. |
| 10 | 4-nitroisophthalonitrile | p-Nitrophenol | 4-(4-nitrophenoxy)isophthalonitrile. |

TABLE II

| Sample No. | Reactant A | Reactant B | Product |
|---|---|---|---|
| 11 | Same as Sample 1 | 4,4'-dihydroxydiphenyl sulfide | |
| 12 | Same as Sample 2 | 4,4'-dihydroxybenzophenone | |
| 13 | Same as Sample 3 | | |
| 14 | Same as Sample 4 | 4,4'-bis(4-hydroxyphenyl)-pentanoic acid | |
| 15 | Same as Sample 3 | Resorcinol | |
| 16 | Same as Sample 4 | | |
| 17 | do | Chlorohydroquinone | |

EXAMPLE 24

Employing the same conditions as recited in Example 21, other compositions can be prepared coming within the scope of Formula VII, substituting other reactants of Formula II in place of the corresponding reactant in Example 21, and other reactants of Formula V in place of the metal salt used in the earlier Example 21. The following Table III recites some of the reactants which can be employed to form products coming within the scope of Formula VII. The definitions of "Reactant A," "Reactant B," "Product" and the designation "Et" are the same as those recited for the equivalent terms in Example 22.

the scope of Formula VIII, substituting other reactants of Formula III in place of the corresponding reactant in Example 20, and other reactants of Formula V in place of the metal salt used in the earlier Example 20. The following Table IV recites some of the reactants which can be employed to form products coming within the scope of Formula VIII. The definitions of "Reactant A," "Reactant B," "Product" and the designation "Et" are the same as those recited for the equivalent terms in Example 22.

TABLE III

| Sample No. | Reactant A | Reactant B | Product |
|---|---|---|---|
| 18 | Same as Sample 5 | Bisphenol "A" | 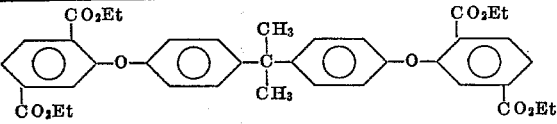 |
| 19 | Same as Sample 6 | Same as Sample 14 | 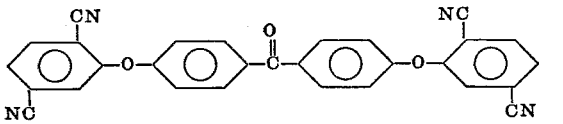 |
| 20 | Same as Sample 5 | Same as Sample 16 | 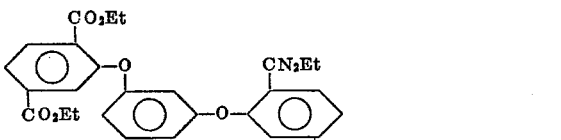 |
| 21 | Same as Sample 6 | Hydroquinone | 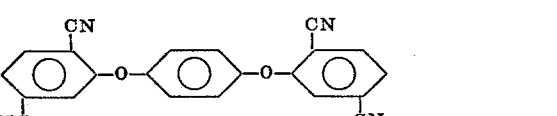 |
| 22 | Same as Sample 6 | Same as Sample 11 | 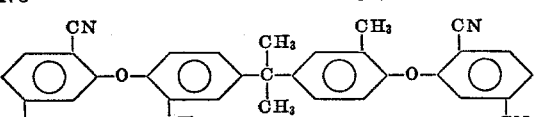 |
| 23 | Same as Sample 6 | 4,4'-dihydroxydiphenyl oxide | 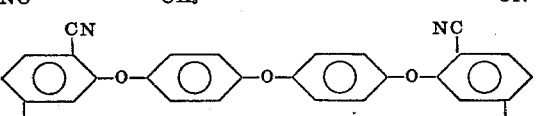 |

EXAMPLE 25

Employing the same conditions as recited in Example 20, other compositions can be prepared coming within

TABLE IV

| Sample No. | Reactant A | Reactant B | Product |
|---|---|---|---|
| 24 | Same as Sample 7 | Same as Sample 18 | 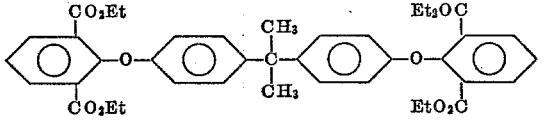 |
| 25 | Same as Sample 8 | Same as Sample 21 | 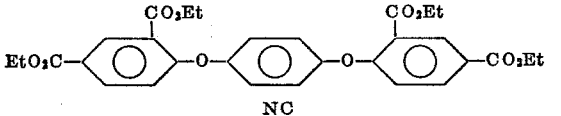 |
| 26 | Same as Sample 9 | Same as Sample 16 | 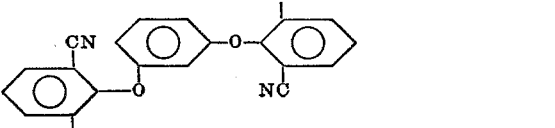 |

TABLE IV—Continued

| Sample No. | Reactant A | Reactant B | Product |
|---|---|---|---|
| 27 | Same as Sample 10 | Same as Sample 14 | 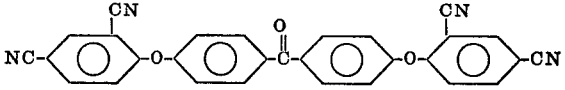 |
| 28 | Same as Sample 9 | Same as Sample 23 | 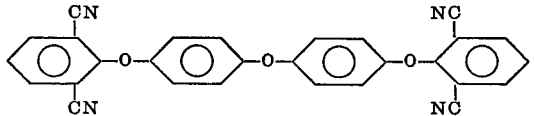 |
| 29 | Same as Sample 10 | Same as Sample 18 | 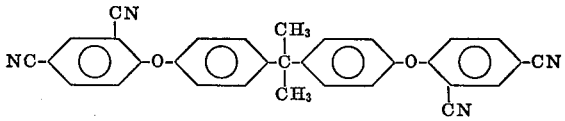 |

The following examples illustrate the unsuccessful attempts to make aryloxy derivatives of aromatic diacids by direct reaction of a metal phenolate with the nitro diacids instead of the nitro esters or nitro nitriles as is called for in the present invention.

Example A

To a solution of 1.16 grams (0.010 mol) sodium phenoxide in 10 ml. DMSO was added 0.70 gram (0.003 mol) 4-nitrophthalic acid and the resulting solution was heated for 24 hours at 100° C. A portion of the solution was withdrawn, neutralized with hydrochloric acid and bistrimethylsilylacetamide was added. Gas-liquid chromatography of the solution showed only the bistrimethylsilyl ester of 4-nitrophthalic acid. Not even trace amounts of the bistrimethylsilyl ester of 4-phenoxyphthalic acid were obtained. Continued heating for an additional 24 hours at 100° C. also failed to show any evidence of the formation of 4-phenoxyphthalic acid.

Example B

To a solution of 1.16 grams (0.010 mol) sodium phenoxide in 10 ml. DMSO was added 0.70 gram (0.003 mol) nitroterephthalic acid and the resulting solution was heated for 24 hours at 100° C. A portion of the solution was withdrawn, neutralized with hydrochloric acid and bistrimethylsilylacetamide was added. Gas-liquid chromatography of the solution showed only the bistrimethylsilyl ester of nitroterephthalic acid indicating that no phenoxyterephthalic acid had formed. Continued heating for an additional 24 hours at 100° C. again failed to produce any of the latter compound.

Example C

To a solution of 1.16 grams (0.010 mol) sodium phenoxide in 10 ml. DMSO was added 0.70 gram (0.003 mol) 2-nitroisophthalic acid and the resulting solution was heated for 24 hours at 100° C. A portion of the solution was withdrawn, neutralized with hydrochloric acid and bistrimethylsilylacetamide was added. Gas-liquid chromatography of the solution showed only the bistrimethylsilyl ester of 2-nitroisophthalic acid indicating that no 2-phenoxyisophthalic acid was obtained. Continued heating for an additional 24 hours at 100° C. also failed to show any displacement by phenoxide radicals.

The compositions herein described and taught and produced in accordance with the invention embraced by the claims have many uses. One of the more important uses to which these compositions may be put are as intermediates in the preparation of other compositions of matter. In addition, many of the compositions herein described and taught, particularly those which are liquid at room temperature, may have application per se as solvents in the preparation of other organic compositions. Furthermore, referring to the simple aryloxy diesters embraced by the compositions obtained, for instance, in Examples 1 to 10 the diesters can be hydrolyzed to give the corresponding dicarboxy derivatives or the dicyano groups can be hydrolyzed to again give the corresponding dicarboxy groups and these dicarboxy substituted compounds can be reacted with long chain monohydric alcohols, for instance, 2-ethylhexanol to give ester compositions which are useful as plasticizers for vinyl halide resins, for instance, polyvinyl chloride resins.

More particularly, one can treat the compound, diethyl-4-phenoxyphthalonitrile in Example 6 smiultaneously with anhydrous HCl and approximately two molar equivalents of 2-ethylhexanol to give the corresponding diester having the formula

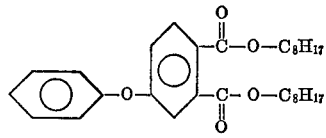

which can be used for plasticizing vinyl halide resins, etc. Again, diethyl-4-phenoxyphthalate of Example 1 can be hydrolyzed to give 4-phenoxyphthalic acid which in turn can be esterified with a long chain monohydric alcohol, such as the aforementioned 2-ethylhexanol to give the same diester which can be employed for plasticizing various polymers, particularly polyvinyl chloride resins. Additionally, these compositions of matter can also be used as ultra-violet light stabilizers for polyolefins, cellulose esters and for polyvinyl chloride resins.

One of the more important uses to which the dicarboxy compositions can be employed is in the preparation of polyester polymeric compositions. As a specific instance, the diethyl-2-phenoxyisophthalate of Example 9 can be caused to react with 1,4-butanediol in a manner well known to those skilled in the art to give the corresponding polyester which can be cast into films useful for packaging purposes.

The tri- and tetra-functional compositions obtained in accordance with the practice of the present invention can be reacted in a manner designed to effect hydrolysis and esterification with the appropriate ingredients similarly as described above. Additionally, the 1,4-bis-(3,4-dicarboethoxyphenoxy)benzene of Example 11 can be hydrolyzed in the usual fashion to remove the ethyl groups on either end and to obtain the corresponding tetracarboxy compound of the formula

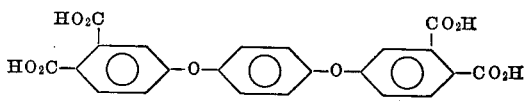

This composition can then be dehydrated to give the corresponding dianhydride which can be used to cure epoxy resins.

The bis(3,4-dicyanophenyl)ether of "Bisphenol-A" (Example 12) can be treated to effect hydrolysis of the nitrile groups and the corresponding tetracarboxy ether can be reacted with long chain monohydric alcohols in a molar ratio of 4 moles of the monohydric alcohol per mole of the tetracarboxy ether. Such an ester can also be used for plasticizing polyvinyl chloride resins. If there is an ester group instead of a nitrile group on an aryl nucleus, the ester group can be hydrolyzed in a manner well known to those skilled in the art to give the corresponding carboxy group and then treated for esterification purposes in the manner described previously. In a similar manner, other compositions coming within the scope of Formulas VI, VII and VIII can be converted into esters which can be used for plasticizing polyvinyl chloride resins.

One of the more important uses of compositions prepared by means of the present invention is as intermediates in the preparation of heat-resistant polyimides, which have many known uses. Specifically, the diethyl-4-(3-aminophenoxy)phthalate of Example 4 can be self-polymerized to a polyimide by hydrolysis to the diacid followed by heating in a suitable solvent such as N-methylpyrrolidone. Another specific example of polyimide preparation utilizes 4,4'-bis(3,4-dicyanophenoxy)diphenyl oxide of Example 17. Hydrolysis of the nitrile groups to carboxy groups and dehydration of these by heating or reaction with acetic anhydride gives the dianhydride which can be caused to react with an aromatic diamine, such as 4,4'-diaminodiphenyl oxide, to give an aromatic polyimide. Other compositions coming within the scope of Formula VI can be employed similarly in the preparation of polyimides in a similar fashion.

Polymers having mixed functional groups, specifically polyesterimides and polyamideimides, can be prepared from compositions coming within the scope of the present invention. These materials have many uses as insulating materials. The 2,3',4'-tricyanodiphenyl ether of Example 2 can be hydrolyzed to the corresponding tricarboxy ether and converted to a polyesterimide or polyamideimide in a manner well known to those skilled in the art.

In addition to the utilities described previously for polymeric compositions derived from the difunctional aryloxy compounds described and taught in the present application, these polymeric compositions can also have other applications. These polymeric compositions may be used to form fibers, films, or molded products. Thus, either by extrusion from melt or by depositing from solution, fibers derived from these polymeric compositions may be formed and used in the preparation of various textile materials designed for clothing and similar applications. In addition, solutions of the polymers can be used to coat electrical conductors for insulation purposes.

Various fillers may be incorporated in the polymeric compositions prior to molding thereof. Among such fillers may be mentioned glass fibers, carbon black, titanium dioxide, silica, mica, bentonite, etc. Molded products derived from such a mixture of ingredients can be used as gears, handles for cooking utensils, etc. The incorporation of abrasive particles such as carborundum, diamond powder, etc., makes molded products derived from such polymeric compositions useful as grinding wheels, etc. The addition of carbon, silicon carbide, powdered metal, conducting oxides, etc., to the polymeric compositions results in the so-called resistance or semiconducting paints which have many useful applications.

The polymeric compositions herein described may also be incorporated into other materials to modify the properties of the latter. For example, they may be compounded with substances such as natural or synthetic rubbers, natural resins such as rosin, copal, shellac, etc.; synthetic resins such as phenol-aldehyde resins, alkyd resins, vinyl resins, esters of acrylic and methacrylic acid, etc.; cellulosic materials such as paper, inorganic and organic esters of cellulose such as cellulose nitrate, cellulose acetate, cellulose ethers, such as methyl cellulose, ethyl cellulose, etc.

Laminated products may be made by superimposing organic or inorganic fiber sheet materials coated and impregnated with the polymeric compositions and thereafter bonding the sheets under heat and pressure. Shaped articles formed from such compositions under heat and pressure in accordance with the practices now widely used in the plastics art have a number of well known applications such as in the decorative field, electrical board field, etc.

It will of course be apparent to those skilled in the art that other conditions of reaction in addition to those specifically described in the foregoing examples may be employed without departing from the scope of the invention. Thus, it is apparent that many of the conditions outlined previously can be used for making the compositions herein described and claimed. Also, it will be apparent that the ingredients chosen for making the desired reaction products can be varied widely, many examples of which have been given above.

What we claim as new and desire to secure by Letters Patent of the United States is:

1. The process which comprises reacting in the presence of a dipolar aprotic solvent of a mixture of ingredients comprising (1) a benzenoid compound selected from the class consisting of (a) compounds of the general formula

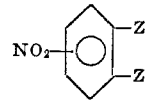

(b) compounds of the general formula

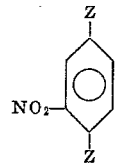

and
  (c) compounds of the general formula

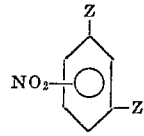

where the $NO_2$ group in (c) is adjacent to a Z radical, and (2) an alkali metal salt of an organic compound selected from the class consisting of (a) compounds of the general formula R—O—Alk and (b) compounds of the general formula Alk—O—R'—Alk, where R is a monovalent aromatic radical selected from the class consisting of monovalent hydrocarbon radicals of from 1 to 10 carbon atoms, alkaryl radicals, organoxyaryl radicals, and pyridyl radicals, R' is a divalent aromatic radical selected from the clss consisting of divalent aromatic hydrocarbon radicals of from 1 to 20 carbon atoms, diarylene radicals in which the two aryl nuclei are joined by a member of the class consisting of alkylene radicals, the sulfoxide group, the sulfonyl group, sulfur, the carbonyl group, oxygen, and the —C(CH$_3$)(CH$_2$CH$_2$CO$_2$H)— group, Z is either —CN or

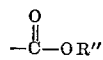

where R'' is a monovalent hydrocarbon radical of from 1 to 12 carbon atoms, and Alk is an alkali metal atom.

2. The process as in claim 1 wherein the benzenoid compound has the general formula

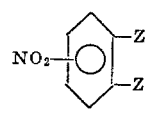

where Z has the meaning given in claim 1.

3. The process as in claim 1 wherein the benzenoid compound has the general formula

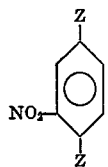

where Z has the meaning given in claim 1.

4. The process as in claim 1 wherein the benzenoid compound has the formula

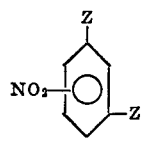

where Z has the meaning given in claim 1.

5. The process as in claim 1 wherein the alkali metal salt has the formula

R—O—Alk where R and Alk have the meanings given in claim 1.

6. The process as in claim 1 wherein the alkali metal salt has the formula

Alk—O—R'—O—Alk where Alk and R' have the meanings defined in claim 1.

7. The process as in claim 1 wherein the benzenoid compound is diethyl-4-nitrophthalate and the alkali metal salt is the sodium salt of 3-aminophenol.

8. The process as in claim 1 wherein the benzenoid compound is diethyl-4-nitrophthalate and the alkali metal salt is the sodium salt of 4-aminophenol.

9. The process as in claim 1 wherein the benzenoid compound is 4-nitrophthalonitrile and the alkali metal salt is the sodium salt of 3-nitrophenol.

10. The process as in claim 1 wherein the benzenoid compound is 4-nitrophthalonitrile and the alkali metal salt is the disodium salt of bisphenol-A.

11. The process as in claim 1 wherein the benzenoid compound is diethyl 4-nitrophthalate and the alkali metal salt is the disodium salt of hydroquinone.

References Cited
UNITED STATES PATENTS

| | | | |
|---|---|---|---|
| 3,637,866 | 1/1972 | De Pasquale et al. | 260—465 X |
| 3,576,882 | 4/1971 | Clark | 260—465 X |
| 3,567,781 | 3/1971 | Clark | 260—465 X |
| 3,489,815 | 1/1970 | Kraus, Jr. | 260—465 X |

ELBERT L. ROBERTS, Primary Examiner

D. H. TORRENCE, Assistant Examiner

U.S. Cl. X.R.

260—75 R, 78 R, 92.8 R, 251 R, 283 CN, 287 R, 294.9, 295, 346.3, 465 E, 465 D, 470, 471 R, 473 R, 516, 520